United States Patent [19]

Frisque et al.

[11] 4,075,144
[45] Feb. 21, 1978

[54] OIL BASE PAINTS CONTAINING WATER-SOLUBLE POLYMERS

[75] Inventors: Alvin J. Frisque, Western Springs; Paul L. DuBrow, Chicago, both of Ill.

[73] Assignee: Nalco Chemical Company, Oak Brook, Ill.

[21] Appl. No.: 770,954

[22] Filed: Feb. 22, 1977

Related U.S. Application Data

[63] Continuation-in-part of Ser. No. 425,483, Dec. 17, 1973, abandoned.

[51] Int. Cl.$^2$ .......................... B63B 1/34; C08L 91/00
[52] U.S. Cl. ............................... 260/22 R; 114/67 A; 260/29.6 WQ
[58] Field of Search ....... 260/29.6 WQ, 22 R, 33.6 R; 114/67 A, 67 R

[56] References Cited

U.S. PATENT DOCUMENTS

| | | | |
|---|---|---|---|
| 2,489,228 | 11/1949 | Rudd | 427/385 R |
| 3,418,237 | 8/1972 | Anderson et al. | 260/29.6 H |

FOREIGN PATENT DOCUMENTS

| | | |
|---|---|---|
| 2,142,383 | 7/1973 | France. |
| 2,226,143 | 4/1973 | Germany. |
| 1,197,566 | 7/1970 | United Kingdom. |

OTHER PUBLICATIONS

Introduction to Paint Technology, Chem. Publishing Co., N. Y. 1951, pp. 1 and 2.
Modern Surface Coatings, Nyles & Sunderland, 1965, Interscience Pubs., pp. 7–10.
Chem. of Organic Film Formers, D. H. Solomon, John Wiley & Sons, pp. 87–89.

*Primary Examiner*—Joseph L. Schofer
*Assistant Examiner*—Peter F. Kulkosky
*Attorney, Agent, or Firm*—John G. Premo; Robert A. Miller; Barry W. Sufrin

[57] ABSTRACT

Disclosed are oil base paints which contain uniformly dispersed therethroughout 2 to less than 50% by weight of a water-in-oil emulsion which emulsion contains at least 2% by weight of particles ranging in size from 5 millimicrons to 5 millimeters of a water-soluble vinyl addition polymer.

3 Claims, No Drawings

OIL BASE PAINTS CONTAINING WATER-SOLUBLE POLYMERS

This is a continuation-in-part of our earlier copending application "oil base paints containing water-soluble polymers," Serial No. 425,483, filed December 17, 1973, now abandoned.

INTRODUCTION

Oil base paints, which for purposes of this invention consist of a binder, optionally a pigment and a thinner which is an organic solvent, have been employed as protective coatings for many years. One use to which such paints are put is the coating of boats. The purpose of painting boats with an oil base paint is to protect their exterior surfaces from exposure to water which can cause rust in the case of metal surfaces or rot in the case of wooden surfaces. Paint also adds to the aesthetic appearance of boats.

Proposals have been made for increasing the speed of boats, such as racing boats, by injecting (in front of the bow or along the hull) water-soluble polymers suh as polyacrylamide or high molecular weight polyethylene oxides to reduce the frictional forces of the water against the bow and hull surfaces. These schemes have met with limited success. They have not been entirely satisfactory since complicated metering, pumping and feeding systems are required. If friction reducing polymeric additives could be incorporated into paint used to protect the bow and hull surfaces of boats and could be slowly released as these vessels move along in water, the frictional coefficient between the boat and the water would be reduced thus allowing greater speeds to be achieved.

OBJECTS

An object of the invention is to provide an oil base paint which contains uniformly dispersed therethroughout a water-soluble polymer which is compatible with such paint.

Another object of the invention is to coat the hull and bow surfaces of boats with such paints, thereby allowing the water-soluble polymer to be released therefrom and to reduce the friction encountered when such treated boats move through the water.

Yet another object of the invention is to coat any type of solid surface with an oil base paint containing a compatible water-soluble polymer which would allow the polymer to be released in contact with water to reduce the coefficient of friction between the coated surface and flowing water which would come in contact therewith.

THE INVENTION

In accordance with the invention there is provided an oil base paint which contains uniformly dispersed therethroughout 2 to less than 50% by weight of a water-in-oil emulsion, which emulsion contains at least 2% by weight of particles ranging in size from 5 millimicrons to 5 millimeters of a water-soluble vinyl addition polymer. In a preferred embodiment of the invention the oil base paint contains from 5 - 25% by weight of the water-in-oil emulsion which contains from 5 - 75% by weight of particles ranging in size from 5 millimicrons to 5 millimeters of a wter-soluble vinyl addition polymer with such vinyl addition polymer being preferably an acrylamide polymer.

THE WATER-SOLUBLE VINYL ADDITION POLYMERS

These polymers are well-known to the art and have been described in numerous publications and patents. The polymers most commonly available are acrylamide polymers which include polyacrylamide and its water-soluble copolymeric derivatives such as, for instance, acrylamide-acrylic acid, and acrylamide-acrylic acid salt copolymers which contain from about 95 - 5% by weight of acrylamide. Also useful are copolymers of acrylamide with other vinyl monomers such as maleic anhydride, acrylonitrile, styrene and the like. It is preferred in the practice of this invention to use acrylamide polymers which are water-soluble and which contain at least 5% by weight of acrylamide.

Other water-soluble vinyl polymers are described in detail in the following U.S. Pat. Nos. 3,418,237, 3,259,570 and 3,171,805.

In examining the disclosures of these patents it will be seen that the water-soluble polymers may be either cationic or anionic and, in some instances, the ionic charges are sufficiently slight so that the polymers may be considered as nonionic.

For example, water-soluble polymers and copolymers of allyl, diallyl amines, or dimethylaminoethylmethacrylate are cationic. Polymers such as polyvinyl alcohol are nonionic, and polymers such as polyacrylic acid or polystyrene sulfonates are anionic. All of these polymers may be used in the practice of the invention.

The molecular weight of the polymers described above may vary over a wide range, e.g. 10,000 – 25,000,000. The polymers may be produced by any known methods of conducting polymerization reactions. Thus, solution suspension or emulsion polymerization techniques may be used.

THE WATER-IN-EMULSIONS

The water-in-oil emulsions may be prepared by any number of known techniques. The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. Aliphatic hydrocarbon oils are most preferred. A particularly useful oil from the standpoint of its physical and chemical properties is the branch-chain isoparaffinic solvent sold by Humble Oil & Refinning Company under the trade name "Isopar M." Typical specifications of this narrow-cut isoparaffinic solvent are set forth below in Table I:

TABLE I

| Specification Properties | Minimum | Maximum | Test Method |
|---|---|---|---|
| Gravity, API at 60/60° F. | 48.0 | 51.0 | ASTM D 287 |
| Color, Saybolt | 30 | | ASTM D 156 |
| Aniline point, ° F. | 185 | | ASTM D 611 |
| Sulfur, ppm | | 10 | ASTM D 1266 (nephelometric mod.). |
| Distillation, ° F: | | | |
| IBP | 400 | 410 | ASTM D 86 |
| Dry point | | 495 | ASTM D 86 |
| Flash point, ° F. | 160 | | ASTM D 93 |

TABLE I-continued

| Specification Properties | Minimum | Maximum | Test Method |
|---|---|---|---|
| (Pensky-Martens closed cup). | | | |

The amount of oil used in relation to the water to prepare the emulsion may be varied over wide ranges. As a general rule, the amount of oil-to-water may vary between 5:1 – 1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that the emulsion be a stable emulsion and to achieve this end it is often necessary to employ an oil-soluble emulsifying agent. The most of emulsifying agent to provide an emulsion will have to be determined by routine experimentation. As a general rule it may be said that the amount of oil-soluble emulsifier may range from 0.1 to 30% by weight based on the weight of the oil. To produce stable emulsions the amount of emulsifier will normally be within the range of 12 – 20% by weight of the oil.

Rather than provide a listing of suitable emulsifiers, I prefer to generally recommend as being satisfactory the so-called low HLB materials which are well documented in the literature and are summarized in the Atlas HLB Surfactant Selector. Although these emulsifiers are useful in producing good water-in-oil emulsions, other surfactants may be used as long as they are capable of producing these emulsions. For instance, I have found that certain high HLB surfactants are capable of producing stable water-in-oil emulsions. A typical low HLB emulsifier is sorbitan monooleate.

DISPERSING THE POLYMERS INTO THE WATER-IN-OIL EMULSIONS

The water-soluble vinyl addition polymers are dispersed into the water-in-oil emulsion. The polymers are produced by most manufacturing processes are in the form of powders or lump-like agglomerates of varying particle size. It is desirable that the particles, before being placed into the emulsion, be comminuted by grinding, abrading or the like so that their average particle size is les than 5 millimeters and preferably is within the range of 1 – 5 microns. After the powders have been comminuted, they may be dispersed into the water-in-oil emulsion by means of agitation provided by such devices as stirrers, shakers, homogenizers and the like. To be commercially practical, the amount of polymer in the emulsion should be at least 2% by weight. The invention contemplates using emulsions containing between 5 – 75% by weight with preferred emulsions having a polymer concentration within the range of 10 – 45% by weight. In some cases the starting emulsions are converted to suspensions due to the nature and the amount of the polymer present therein.

The method of preparing a water-in-oil emulsion by the use of a homogenization device is quite simple. Water is added with agitation to an oil-emulsifier mixture to make an emulsion. The finely divided polymer particles are then added to the emulsion with rapid agitation. The particle size of the polymer should be within the range of 1 micron to about 5 microns. This suspension of polymer particles in the emulsion is passed through a homogenizer. The amount of pressure necessary to produce a smooth emulsion varies in each experiment. The minimum pressure requirement is a function of the abrasiveness of the polymer, the concentration of the polymer, and the particle size of the polymer. In general, the pressure requirement is between 1000 – 3000 p.s.i. However, depending upon those variables listed, the pressure requirement could be lower or exceed the stated range. A typical homogenizer device is the Manton-Gaulin type.

From a commercial standpoint is is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce, particle sizes within these limitations, spray dryers with appropriate size nozzles may be used. It also is possible to prepare the polymer-containing emulsion of the water-soluble vinyl addition polymers directly from the vinyl monomers from which these polymers ae synthesized. Such polymer-containing emulsion may be synthesized by using the water-in-oil emulsion polymerization technique set forth in U.S. 3,284,393. The teachings of this patent comprise forming a water-in-oil emulsion of water-soluble ethylenic unsaturated monomers. The emulsion is formed by utilizing a water-in-oil emulsion of water-soluble ethylenic unsaturated monomers. The emulsion is formed by utilizing water-in-oil emulsifying agent. To this monomer is added a free radical-type polymerization catalyst and then heat is applied under free radical-forming conditions to form water-soluble polymer latices. The polymeric latices produced by this patent sometimes must be treated with additional emulsifiers to render the products stable.

To illustrate typical polymer containing water-in-oil emulsions, Table II is presented below:

TABLE II

| EXAMPLE NO. | WATER % BY WT. | OIL % BY WT. | POLYMER | % IN EMULSION | POLYMER PARTICLE SIZE RANGE |
|---|---|---|---|---|---|
| 1 | 72 | 28 (I) | 26.6% acrylamide; 2% methacrylic acid | 35 | 5 – 70 microns |
| 2 | 72 | 28 (I) | " | 35 | " |
| 3 | 72 | 28 (T) | 70% acrylamide; 30% acrylic acid | 35 | " |
| 4 | 72 | 28 (T) | Acrylamide | 35 | " |
| 5 | 67 | 33 (I) | 93% acrylamide; 7% methacrylic acid | 32 | <30 microns |
| 6 | 67 | 33 (I) | 75% acrylamide; 25% DMAEM | 30 | " |
| 7 | 67 | 33 (T) | Acrylamide | 35 | 10 microns-1 mm |
| 8 | 50 | 50 (I) | 70% acrylamide; 30% acrylic acid | 34 | " |
| 9 | 48 | 52 (I) | Sodium polyacrylate | 37 | < 1 mm |
| 10 | 23 | 67 (I) | Acrylamide (dry solids into emulsion) | 23 | 10 microns-1 mm |
| 11 | 42 | 58 (I) | DMAEM | 24 | <30 microns |

TABLE II-continued

| EXAMPLE NO. | WATER % BY WT. | OIL % BY WT. | POLYMER | % IN EMULSION | POLYMER PARTICLE SIZE RANGE |
|---|---|---|---|---|---|
| 12 | 42 | 58 (I) | Polystyrene sulfonate | 24 | " |

NOTE - I=Isopar M; T=Toluene; DMAEM=Dimethyl aminoethyl methacrylate

THE OIL BASE PAINTS

As previously indicated, the oil base paint is composed of a binder and a thinner, e.g. organic solvent, and optionally a pigment. If the pigment of omitted, the paint is commonly known as a varnish. For a more thorough description of oil base paints, reference may be had to the Encyclopedia of Chemical Technology, 2nd edition, Volume 5, Page 690 (coatings, industrial), published by Interscience Publishers, New York, 1964.

Common binders for paints are alkyd resins. Such binders when incorporated with thinners such as mineral spirits, petroleum solvents, turpentine and the like allow a wide variety of coating compositions to be prepared. When pigments are added to such binder-thinner systems, paints are formed. The pigment tends to provide coloring effects to the paints and improve their hiding power. Typical pigments are iron oxides, titanium dioxide, inorganic oxides, solid organic materials and the like.

When the polymer containing water-in-oil emulsions are added to oil base paints in the quantities previously described, and these paints are, for instance, coated upon the hull of a boat, it has been found that when the hulls of such boats are contacted with seawater or fresh water the polymer is slowly released from the paint coating. This provides a lubricating effect which tends to substantially reduce the coefficients of friction caused by the hull portion of the vessel moving against the water when the boat is underway.

The oil base paint which contains the water-in-oil emulsion - polymer systems may be applied by known means such as dipping, spraying brushing, rolling electrostatic coating and the like. It is beneficial if a rather thick film is applied which provides a slow release of the polymer over long periods of time.

To illustrate the invention the following paint formulas were prepared.

EXAMPLE 13

Listed below is a commercial paint formula which was used in the preparation of the compositions:

| | |
|---|---|
| Titanium Dioxide | 31.73% |
| Soya Alkyd Resin | 27.66% |
| Aromatic Hydrocarbon | 3.45% |
| Mineral Spirits and Driers | 37.16% |

To the above oil base paint formula was added the water-in-oil emulsion corresponding to Example 1, Table II in the following amounts:

| Formula | % by Weight |
|---|---|
| I | 50 |
| II | 25 |
| III | 12.5 |
| IV | 6.25 |
| V | 3.125 |

The paint was then stirred until the emulsion containing the polymer was completely distributed throughout the paint. The paint was then poured onto 2 inch square thin steel plates in the form of a thick film and allowed to dry for 2 days at room temperature. At the end of that time Chicago tap water was rubbed by hand on the surfaces of these paints. Those paints containing between 6.25 and 25% by weight of the emulsion became immediately slippery to the touch.

Those containing from 50 - 3.125 show some slipperyness but not as significantly as the other samples. The 50% paint was still somewhat tacky with the effect being that the polymer was apparently interferring with the drier system of the paint. This, of course, could be corrected by changing to a slightly different drier system.

We claim:

1. A more tacky oil base paint which contains uniformly dispersed therethroughout from 2 to 50% by weight of a water-in-oil emulsion, which emulsion contains at least 2% by weight of particles ranging in size from 5 millimicrons to 5 millimeters of a water-soluble vinyl addition polymer, said oil base paint being composed of a binder, an organic solvent and optionally a pigment.

2. The oil base paint of claim 1 wherein the water-in-oil emulsion contains from 5 to 75% by weight of particles ranging in size from 5 millimicrons to 5 microns of a water-soluble vinyl addition polymer.

3. The oil base paint of claim 2 wherein the water-soluble vinyl addition polymer is an acrylamide polymer.

* * * * *

UNITED STATES PATENT AND TRADEMARK OFFICE
CERTIFICATE OF CORRECTION

PATENT NO. : 4,075,144
DATED : February 21, 1978
INVENTOR(S) : Alvin J. Frisque, et al It is certified that error appears in the above-identified patent and that said Letters Patent are hereby corrected as shown below:

Line 1 of claim 1, "A more tacky oil base paint" should read -- A non-tacky oil base paint --.

Signed and Sealed this

Twentieth Day of June 1978

[SEAL]

Attest:

RUTH C. MASON
Attesting Officer

DONALD W. BANNER
Commissioner of Patents and Trademarks